United States Patent

[11] 3,561,783

| [72] | Inventor | Richard H. Ellett |
| | | 4435 Sunset Ave., Montrose, Calif. 91020 |
| [21] | Appl. No. | 831,517 |
| [22] | Filed | June 9, 1969 |
| [45] | Patented | Feb. 9, 1971 |

[54] SKI BIKE
9 Claims, 4 Drawing Figs.

[52] U.S. Cl. .................................................. 280/16
[51] Int. Cl. ...................................................... B62b 13/04
[50] Field of Search ........................................... 280/12, 16, 18, 19, 21, 22

[56] References Cited
UNITED STATES PATENTS

| 1,672,782 | 6/1928 | Ring | 280/21 |
| 1,809,295 | 6/1931 | Gundersen | 280/16 |
| 2,479,674 | 8/1949 | Elliot | 280/16 |
| 3,178,196 | 4/1965 | Colace | 280/16 |

FOREIGN PATENTS

| 385,637 | 3/1961 | Switzerland | 280/16 |

*Primary Examiner*—Leo Friaglia
*Assistant Examiner*—Robert R. Song
*Attorney*—Jessup and Beecher

ABSTRACT: An improved collapsible ski bike is provided for gliding down snow covered slopes. The ski bike of the invention includes a frame supported on a rear ski by means of a shock absorber, a seat mounted on the frame, and turnable steering means including handle bars attached to the frame and supported on a forward ski.

PATENTED FEB 9 1971 3,561,783

INVENTOR:
Richard H. Ellett
Kerry and Beecher
By Keith D. Beecher
ATTORNEYS

SKI BIKE

BACKGROUND OF THE INVENTION

In the past, vehicles of the general type with which the present invention is concerned usually have been constructed of an integral unitary frame structure which is bulky and heavy, so as to be awkward to handle and difficult to carry. In addition, the prior art structures for the most part are relatively difficult to fabricate and expensive to manufacture.

The ski or snow bike of the present invention, on the other hand, is constructed to be readily portable, easy to manufacture, and relatively inexpensive in cost. In addition, the snow bike to be described is a rugged and durable vehicle, and one which is capable of achieving high coasting speeds with easy maneuverability in all types of snow conditions.

A further disadvantage in many of the prior art ski bikes is that the skis which serve as runners for the bikes are rigidly attached to the frame. With such a construction, there is no resiliency in the ride of the vehicle, making it hard riding and uncomfortable. The rigid attachment of the skis to the frame in such prior art devices also reduces the speed of the vehicle, since the skis have a tendency to dig into the snow.

Briefly stated, the present invention provides an improved, practical and efficient snow bike, and one which is relatively simple and inexpensive to manufacture. Moreover, the snow bike of the invention is collapsible and light in weight so as to be easily portable. A further feature is the fact that the main ski is resiliently coupled to the rear of the frame through a shock absorber, so as to increase the comfort of the ride and reduce sliding friction to a minimum.

DETAILED DESCRIPTION OF THE ILLUSTRATED EMBODIMENT

Figure 1:
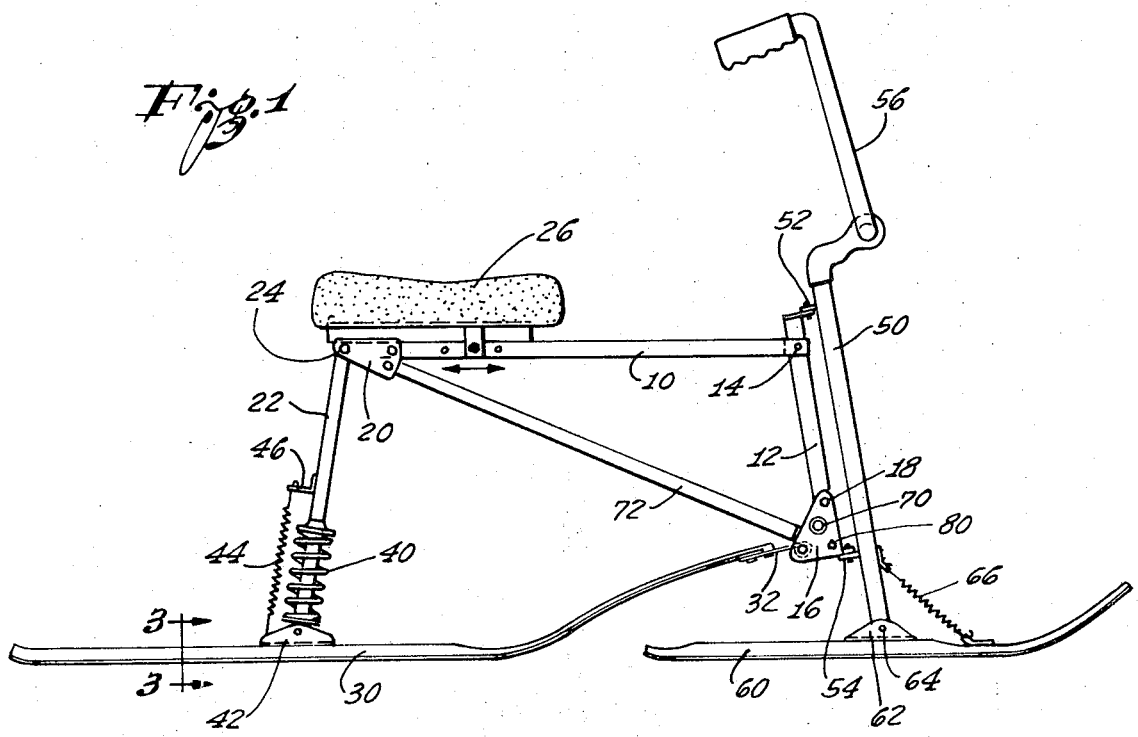
FIG. 1 is a side elevation of a snow bike constructed to incorporate the concepts of the present invention.

The illustrated embodiment of the ski incorporating the concepts of the invention includes a frame having a top tubular member 10 which is generally horizontal when the vehicle is being operated. The tubular member 10, and the other components of the snow bike may be constructed of steel, or other appropriate material.

The forward end of the top member 10 is connected to a first front tubular member 12 by means of a removable fastener 14 which may, for example, be a bolt with a wing nut. The front member 12 extends generally vertically, and its lower end is connected to a V-shaped bracket 16 by means, for example, of a bolt or rivet 18, or other suitable fastener.

A further bracket 20 is mounted on the rear end of the top member 10, and a generally vertical rear tubular member 22 is connected at its upper end to the bracket 20 by means of a removable fastener 24, such as a bolt with a wing nut.

A padded bicycle type of seat 26 is mounted on the top member 10, and is appropriately padded. The seat 26 may be adjusted to various positions along the top member 10 by an appropriate fastener combination, so as to suit the needs of the individual riders.

The vehicle of FIG. 1 includes a rear ski 30, the forward end of which is curved upwardly, as shown, and is coupled to the bracket 16 by means of a further bracket 32. The front end of the ski 30 is adjustable to various positions on the bracket 32 so as to accommodate different ski conditions.

Figure 3:
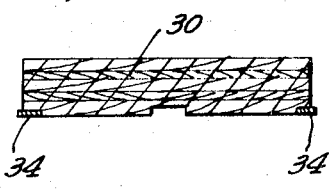
FIG. 3 is a cross section of the rear ski of the snow bike, enlarged with respect to FIG. 1, and taken along the line 3-3 of FIG. 1.

The ski 30 may have the form shown in FIG. 3, for example. That is, it may have a laminated wooden construction with metal edges 34. Alternately, the rear ski 30 may be formed of extruded aluminum, or other appropriate material.

A shock absorber 40 serves to couple the lower end of the rear member 22 to an intermediate point on the ski 30, the shock absorber being pivotally mounted to the ski by a bracket 42. The shock absorber 40 operates in known manner to permit resilient reciprocal movement of the rear member 22 with respect to the ski. A spring 44 is connected across the shock absorber 40 between the bracket 42 and another bracket 46 secured to the rear member 22. The spring 40 serves as a limiter, so as to limit the upward return movement of the shock absorber, thereby smoothing out the ride experienced by the rider.

The front member 12 is coupled to a further front tubular member 50 by appropriate upper and lower couplings 52 and 54. These couplings may be ball bearing suspensions so as to facilitate the steering of the vehicle. The further front member 50 is rotatable about an axis which is generally vertical, and its rotation is controlled, for example, by a pair of usual bicycle handle bars 56 mounted on its upper end.

Figure 2:
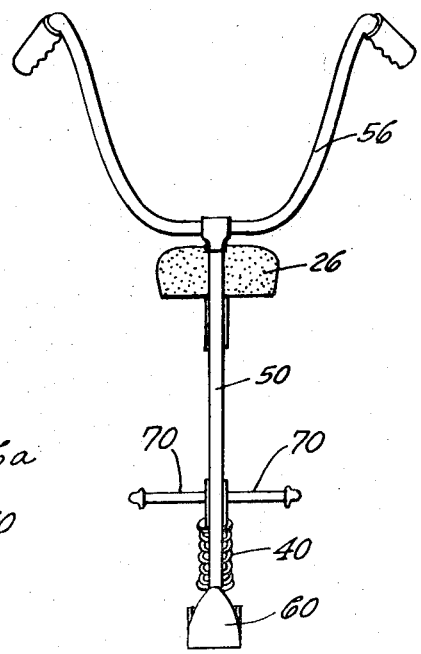
FIG. 2 is a front view of the snow bike.

A front ski 60 is mounted to the lower end of the front member 50 by means of a bracket 62 at an intermediate point on the front ski. The forward end of the front ski is curved upwardly as shown. The bracket 62 is pivotally mounted to the lower end of the front member 50 by a pin 64. A resilient spring 66 is connected to the front ski and to the member 50, so as to bias the forward end of the front ski upwardly. A pair of foot pegs 70 are mounted on the bracket 16, and extend outwardly on both sides of the bracket, as best shown in FIG. 2.

Figure 4:
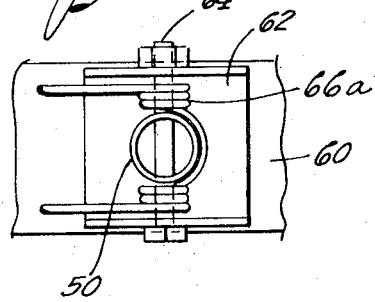
FIG. 4 is a fragmentary representation of a modified coupling between the forward end of the frame and the front ski of the snow bike.

The spring 66 may be replaced by a double torsion spring 66a, as shown in FIG. 4, and which functions in the same way as the spring 66 to bias the forward end of the front ski upwardly.

The snow bike of FIG. 1 may be readily collapsed for easy portability. This may be achieved, for example, by removing the fasteners 14 and 24 and also by removing a fastener 80 which couples the bracket 16 to an inclined tubular member 72 extending from the bracket 20 at the rear of the top member 10.

With these fasteners removed, the rear member 22 may be turned down on the ski 30, the top member 10 may be turned down about the rear pivot fastener 24, and the front members 12 and 15 may be turned down on the collapsed assembly. The front ski 60 may be turned back and removed. The entire assembly may then be carried, for example, in an appropriate carrying case such as a zippered bag.

The invention provides, therefore, an improved ski bike which is rugged in its construction, and yet relatively simple and inexpensive. The ski bike is easy and comfortable to ride, and is efficient and maneuverable. Moreover, the assembly is easily collapsible, and readily portable.

I claim:

1. A ski bike comprising: a frame including a generally horizontal tubular top member, a generally vertical tubular front member connected to the forward end of said top member and extending downwardly with respect to said top member, a generally vertical tubular rear member connected to the rear end of said top member and extending downwardly with respect to said top member, and an inclined tubular member connected to the rear end of said top member and to the lower end of said front member; a seat mounted on the rear end of said top member; a rear ski having its forward end curved upwardly and connected to the junction of said inclined member and front member; shock absorber means connected to the lower end of said rear member and to said rear ski and interposed therebetween; a further generally vertical front tubular member connected to said first named front member and extending essentially parallel thereto for rotation about a generally vertical axis; handlebars connected to the upper end of said further front member; and a front ski connected to the lower end of said further front member.

2. The combination defined in claim 1 in which said shock absorber is connected to said rear ski at a point intermediate the ends of said rear ski.

3. The combination defined in claim 1 and which includes bracket means interconnecting said rear ski to said inclined member and front member; and horizontally extending foot pegs mounted on each side of said bracket means.

4. The combination defined in claim 1 in which said rear ski is pivotally mounted to said shock absorber means; and which includes bracket means connecting said rear ski to the junction of said inclined member and said front member, said rear ski being adjustably connected to said bracket means.

5. The combination defined in claim 1 and which includes a resilient limiter member connected across said shock absorber means.

6. The combination defined in claim 1 in which said seat is adjustable along said top member.

7. The combination defined in claim 1 in which said front ski is pivotally mounted to the lower end of said further front member, and which includes resilient means connected to said front ski and to said further front member and biasing the forward end of said front ski upwardly.

8. The combination defined in claim 1 and which includes bracket means interconnecting said rear ski to said inclined member and front member.

9. The combination defined in claim 7, and which includes removable fasteners connecting the upper end of said rear member to the rear end of said top member, the forward end of said top member to said first named front member, and said bracket means to said inclined member.